US012637624B2

(12) United States Patent
　　Jahnke

(10) Patent No.:　US 12,637,624 B2
(45) Date of Patent:　May 26, 2026

(54) FLUIDIZED CATALYTIC CRACKING UNIT SYSTEM WITH INTEGRATED REFORMER-ELECTROLYZER-PURIFIER

(71) Applicant: FuelCell Energy, Inc., Danbury, CT (US)

(72) Inventor: Fred C. Jahnke, Rye, NY (US)

(73) Assignee: FUELCELL ENERGY, INC., Danbury, CT (US)

(*) Notice: Subject to any disclaimer, the term of this patent is extended or adjusted under 35 U.S.C. 154(b) by 778 days.

(21) Appl. No.: 17/727,305

(22) Filed: Apr. 22, 2022

(65) Prior Publication Data

US 2022/0243134 A1　　Aug. 4, 2022

Related U.S. Application Data

(63) Continuation of application No. 16/091,001, filed as application No. PCT/US2017/028321 on Apr. 19, 2017, now Pat. No. 11,339,333.
(Continued)

(51) Int. Cl.
| | |
|---|---|
| *C10G 11/18* | (2006.01) |
| *C01B 3/34* | (2006.01) |
| *C25B 1/00* | (2021.01) |
| *C25B 1/04* | (2021.01) |
| *C25B 9/19* | (2021.01) |

(52) U.S. Cl.
CPC .............. *C10G 11/182* (2013.01); *C01B 3/34* (2013.01); *C10G 11/18* (2013.01); *C25B 1/00* (2013.01); *C25B 1/04* (2013.01); *C25B 9/19*

(2021.01); *C01B 2203/067* (2013.01); *Y02C 20/40* (2020.08); *Y02E 60/50* (2013.01); *Y02P 30/40* (2015.11)

(58) Field of Classification Search
None
See application file for complete search history.

(56) References Cited

U.S. PATENT DOCUMENTS

| | | | |
|---|---|---|---|
| 3,094,390 A | 6/1963 | Vander | |
| 3,180,813 A | 4/1965 | Wasp et al. | |
(Continued)

FOREIGN PATENT DOCUMENTS

| | | | |
|---|---|---|---|
| CA | 1242985 A | 8/1985 | |
| CA | 2937948 A | 8/2015 | |
(Continued)

OTHER PUBLICATIONS

Amorelli et al., "An experimental investigation into the use of molten carbonate fuel cells to capture CO2 from gas turbine exhaust gases", Energy 29 (2004) 1279-1284, doi:10.1016/j.energy.2004.03.087 (Year: 2004).
(Continued)

*Primary Examiner* — Louis J Rufo
(74) *Attorney, Agent, or Firm* — Foley & Lardner LLP

(57) ABSTRACT
A fluidized catalytic cracking unit system includes: a fluidized catalytic cracking unit assembly including a first catalyst regenerator and a cracking unit, the cracking unit configured to output spent catalyst to the first catalyst regenerator; and a reformer-electrolyzer-purifier assembly comprising a reformer-electrolyzer-purifier cell, the reformer-electrolyzer-purifier cell comprising an anode section and a cathode section.

15 Claims, 1 Drawing Sheet

Related U.S. Application Data

(60) Provisional application No. 62/325,707, filed on Apr. 21, 2016.

(56) References Cited

U.S. PATENT DOCUMENTS

| | | | |
|---|---|---|---|
| 4,849,091 A * | 7/1989 | Cabrera | C10G 11/182 |
| | | | 208/159 |
| 5,071,719 A | 12/1991 | Rostrup-Nielsen et al. | |
| 5,346,613 A | 9/1994 | Lomas et al. | |
| 5,346,778 A | 9/1994 | Ewan et al. | |
| 5,413,878 A | 5/1995 | Williams et al. | |
| 5,711,770 A | 1/1998 | Malina | |
| 5,928,806 A | 7/1999 | Olah et al. | |
| 6,187,465 B1 | 2/2001 | Galloway | |
| 7,070,874 B2 | 7/2006 | Blanchet et al. | |
| 7,150,927 B2 | 12/2006 | Hickey et al. | |
| 7,201,979 B2 | 4/2007 | McElroy et al. | |
| 7,323,270 B2 | 1/2008 | Patel et al. | |
| 7,353,085 B2 | 4/2008 | Rusta-Sallehy et al. | |
| 7,364,810 B2 | 4/2008 | Sridhar et al. | |
| 7,396,603 B2 | 7/2008 | Farooque et al. | |
| 7,422,810 B2 | 9/2008 | Venkataraman et al. | |
| 7,482,078 B2 | 1/2009 | Sridhar et al. | |
| 7,575,822 B2 | 8/2009 | Mitlitsky et al. | |
| 7,704,618 B2 | 4/2010 | Venkataraman et al. | |
| 7,781,112 B2 | 8/2010 | Sridhar et al. | |
| 7,833,668 B2 | 11/2010 | Ballantine et al. | |
| 7,846,599 B2 | 12/2010 | Ballantine et al. | |
| 7,878,280 B2 | 2/2011 | Sridhar et al. | |
| 7,887,971 B2 | 2/2011 | Hickey et al. | |
| 7,901,814 B2 | 3/2011 | Venkataraman et al. | |
| 7,935,245 B2 * | 5/2011 | Towler | C10G 11/182 |
| | | | 252/373 |
| 8,053,136 B2 | 11/2011 | Hickey et al. | |
| 8,071,241 B2 | 12/2011 | Sridhar et al. | |
| 8,071,246 B2 | 12/2011 | Mitlitsky et al. | |
| 8,277,992 B2 | 10/2012 | Mitlitsky et al. | |
| 8,435,689 B2 | 5/2013 | Venkataraman | |
| 8,663,859 B2 | 3/2014 | Mitlitsky et al. | |
| 8,852,820 B2 | 10/2014 | Perry et al. | |
| 9,190,693 B2 | 11/2015 | Sridhar et al. | |
| 9,413,017 B2 | 8/2016 | Bandhauer et al. | |
| 9,478,819 B2 | 10/2016 | Lambrech et al. | |
| 9,722,273 B2 | 8/2017 | Perry et al. | |
| 9,911,989 B2 | 3/2018 | Mcelroy et al. | |
| 9,947,955 B2 | 4/2018 | Sridhar et al. | |
| 10,096,840 B1 | 10/2018 | Venkataraman et al. | |
| 10,361,442 B2 | 7/2019 | Perry et al. | |
| 10,581,090 B2 | 3/2020 | Ballantine et al. | |
| 2002/0004154 A1 | 1/2002 | Pastula et al. | |
| 2004/0180249 A1 | 9/2004 | Pham et al. | |
| 2004/0185313 A1 | 9/2004 | Halter | |
| 2004/0202914 A1 | 10/2004 | Sridhar et al. | |
| 2005/0058863 A1 | 3/2005 | Wang et al. | |
| 2005/0112425 A1 | 5/2005 | Hsu | |
| 2005/0123810 A1 | 6/2005 | Balan | |
| 2005/0197743 A1 | 9/2005 | Rusta-Sallehy et al. | |
| 2005/0271914 A1 | 12/2005 | Farooque et al. | |
| 2006/0140823 A1 | 6/2006 | Katikaneni et al. | |
| 2006/0248800 A1 | 11/2006 | Miglin et al. | |
| 2007/0017369 A1 | 1/2007 | Levan et al. | |
| 2008/0060935 A1 | 3/2008 | Hartvigsen | |
| 2008/0075990 A1 | 3/2008 | Isozaki et al. | |
| 2008/0155984 A1 | 7/2008 | Liu et al. | |
| 2008/0184880 A1 * | 8/2008 | Fan | F23J 15/06 |
| | | | 95/40 |
| 2008/0314741 A1 | 12/2008 | Balestrino et al. | |
| 2009/0110989 A1 | 4/2009 | Daly et al. | |
| 2009/0158662 A1 | 6/2009 | Towler | |
| 2009/0226775 A1 | 9/2009 | Jahnke et al. | |
| 2009/0235587 A1 | 9/2009 | Hawkes et al. | |
| 2010/0047641 A1 | 2/2010 | Jahnke et al. | |
| 2010/0215566 A1 | 8/2010 | Lourenco et al. | |
| 2010/0266923 A1 | 10/2010 | Mcelroy et al. | |

| | | | |
|---|---|---|---|
| 2010/0304228 A1 | 12/2010 | Majarov et al. | |
| 2011/0104577 A1 | 5/2011 | Cui et al. | |
| 2011/0189567 A1 | 8/2011 | Venkataraman et al. | |
| 2012/0068661 A1 | 3/2012 | Fracas | |
| 2013/0052548 A1 | 2/2013 | Nedergaard Clausen et al. | |
| 2013/0108936 A1 | 5/2013 | Mcelroy et al. | |
| 2013/0126038 A1 | 5/2013 | Jamal et al. | |
| 2013/0177824 A1 | 7/2013 | Cui et al. | |
| 2013/0251598 A1 | 9/2013 | Gil et al. | |
| 2013/0260268 A1 | 10/2013 | Shapiro et al. | |
| 2014/0076213 A1 | 3/2014 | Ingram et al. | |
| 2014/0080076 A1 | 3/2014 | Lutz | |
| 2014/0093798 A1 | 4/2014 | Snyder et al. | |
| 2014/0272626 A1 | 9/2014 | Berlowitz et al. | |
| 2014/0272629 A1 | 9/2014 | Berlowitz et al. | |
| 2015/0280265 A1 | 10/2015 | Mclarty | |
| 2016/0344045 A1 | 11/2016 | Ishino et al. | |
| 2016/0351930 A1 | 12/2016 | Jahnke et al. | |
| 2020/0161671 A1 | 5/2020 | Ballantine et al. | |

FOREIGN PATENT DOCUMENTS

| | | | |
|---|---|---|---|
| CN | 101427408 A | 5/2009 | |
| CN | 104847424 A | 8/2015 | |
| CN | 106133973 A | 11/2016 | |
| DE | 10 2012 206 541 A1 | 10/2013 | |
| EP | 0 100 531 | 2/1984 | |
| EP | 1 620 906 | 2/2006 | |
| EP | 1 665 441 | 6/2006 | |
| EP | 2 784 187 A1 | 10/2014 | |
| EP | 3 054 519 A1 | 8/2016 | |
| JP | 51-008405 A | 1/1976 | |
| JP | 60-235893 | 11/1985 | |
| JP | 06-005301 A | 1/1994 | |
| JP | 11-169661 A | 6/1999 | |
| JP | 11-223475 A | 8/1999 | |
| JP | 2002-319428 | 10/2002 | |
| JP | 2004-099927 A | 4/2004 | |
| JP | 2004-311159 A | 11/2004 | |
| JP | 2007-162531 | 6/2007 | |
| JP | 2007-523443 | 8/2007 | |
| JP | 2008-507113 A | 3/2008 | |
| JP | 2009-517547 | 4/2009 | |
| JP | 2010-013333 A | 1/2010 | |
| JP | 2010-518559 A | 5/2010 | |
| JP | 2010-129286 | 6/2010 | |
| JP | 2010-211931 A | 9/2010 | |
| JP | 2010-212141 A | 9/2010 | |
| JP | 2010-228963 A | 10/2010 | |
| JP | 2012-514039 | 6/2012 | |
| JP | 2014-198789 | 10/2014 | |
| JP | 2005-293934 A | 10/2015 | |
| JP | 6096790 B2 | 3/2017 | |
| JP | 2017-511956 | 4/2017 | |
| KR | 1020070057131 A | 6/2007 | |
| KR | 20110114816 | 10/2011 | |
| KR | 1020160114632 A | 10/2016 | |
| WO | WO-01/04045 | 1/2001 | |
| WO | WO-2007/015689 A2 | 2/2007 | |
| WO | WO-2009/031747 A1 | 3/2009 | |
| WO | WO-2010/021997 A2 | 2/2010 | |
| WO | WO-2013/029701 A1 | 3/2013 | |
| WO | WO-2015116964 A1 * | 8/2015 | C25B 1/04 |
| WO | WO-2015/153064 A1 | 10/2015 | |
| WO | WO-2017/087405 A1 | 5/2017 | |

OTHER PUBLICATIONS

Campanari et al., "Using MCFC for high efficiency CO2 capture from natural gas combined cycles: Comparison of internal and external reforming", Applied Energy 112 (2013) 772-783).

Caprile et al.; Carbon capture: Energy wasting technologies or the MCFCs challenge? International Journal of Hydrogen Energy; 2011 ;36:10269-77.

Desideri et al.; MCFC-based CO2 capture system for small scale CHP plants. International Journal of Hydrogen Energy. 2012;37: 19295-303.

(56) References Cited

OTHER PUBLICATIONS

Extended European Search Report dated Oct. 26, 2018 for EP18182210.7 (8 pages).
Extended European Search Report in EP 15744017.3 dated Aug. 16, 2017 (12 pages).
Extended European Search Report in EP16866931 dated May 2, 2019 (10 pages).
Extended European Search Report in EP16867038.8 dated Jun. 27, 2019 (8 pages).
Extended European Search Report on EP16866959.6 dated May 3, 2019 (10 pages).
Extended European Search Report received in EP16866965.3, dated Jun. 17, 2019 (7 pages).
Extended European Search Report received in EP18182124.0 dated Dec. 7, 2018 (6 pages).
Filipponi et al., "Use of Molten Carbonate Fuel Cell for CO2 Capture", ECS Transactions, 42 (1) 43-47 (2012), 10.1149/ 1.4705478. (Year: 2012).
Final Office Action in U.S. Appl. No. 15/815,556 dated Apr. 8, 2020.
Final Office Action on U.S. Appl. No. 16/091,001 Dtd Oct. 5, 2021.
Final Office Action on U.S. Appl. No. 16/091,001 Dtd Dec. 4, 2020.
First Office Action in CN 2016800735683 dated Aug. 3, 2020, with English translation (16 pages).
Heidenbrecht et al., Molten Carbonate Fuel Cell (MCFC) with Internal Reforming: model-based analysis of cell dynamics, Chemical Engineering Science, vol. 58, issues 3-6, 2003, pp. 1029-1036.
Hu et al., "Electrochemical performance of reversible molten carbonate fuel cells", International Journal of Hydrogen Energy, vol. 39, Issue 23, Aug. 4, 2014, pp. 12323-12329.
International Search Report and Written Opinion dated May 6, 2014 in PCT/US2015/013837 (13 pages).
International Search Report and Written Opinion dated Jul. 19, 2017 for PCT/US17/28321 (16 pages).
International Search Report and Written Opinion dated Jul. 26, 2017 in PCT/US17/30230 (13 pages).
International Search Report and Written Opinion for PCT/US16/ 61981 dated Jan. 19, 2017 (8 pages).
International Search Report and Written Opinion in PCT/IB2018/ 058968 dated Jan. 23, 2019 (16 pages).
International Search Report and Written Opinion in PCT/IB2018/ 059191 dated Mar. 27, 2019 (20 pages).
International Search Report and Written Opinion in PCT/US/16/ 62276, dated Jan. 31, 2017 (8 pages).
International Search Report and Written Opinion in PCT/US16/ 62069 dated Jan. 27, 2017 (10 pages).
International Search Report and Written Opinion on PCT/US16/ 62083, dated Jan. 31, 2017, 8 pages.
Itou et al., "High Efficiency CO2 Separation and Concentration System By Using Molten Carbonate", Greenhouse Gas Control Technologies—6th International Conference Proceedings of the 6th International Conference on Greenhouse Gas Control Technologies Oct. 2002, Kyoto, Japan vol. pp. 1331-1334.
Kasai et al., "High Temperature Electrochemical Separation of Carbon Dioxide Using Molten Carbonate", Denki Kagaku, 66, No. 6, 1998, p. 635-640.
Kasai, "CO2 Electrochemical Separation By Molten Carbonate Technology," Fuel Chemistry Division Preprints, 2002, 47(1), 69-70.
Manuel, B et al., Power to Gas-biomass oxycombustion hybrid system: Energy integration and potential applications, Applied Energy, Elsevier Science Publishers, GB, vol. 167, Oct. 16, 2015, pp. 221-229.

Millet et al., "Chapter 2—Water Electrolysis Technologies", Renewable Hydrogen Technologies, 2013.
Moreno et al., International Status of Molten Carbonate Fuel Cell (MCFC) Technology, Jan. 2008.
Non-Final Office Action in U.S. Appl. No. 15/980,291 dated Jun. 22, 2020 (21 pages).
Non-Final Office Action on U.S. Appl. No. 15/115,186 dated Dec. 31, 2018 (7 pages).
Non-Final Office Action on U.S. Appl. No. 15/815,556 Dtd Oct. 28, 2019.
Non-Final Office Action on U.S. Appl. No. 16/091,001 Dtd Jun. 18, 2021.
Non-Final Office Action on U.S. Appl. No. 16/091,001 Dtd Aug. 12, 2020.
Non-Final Office Action on U.S. Appl. No. 16/266,699 Dtd Oct. 16, 2020.
Notice of Allowance in U.S. Appl. No. 15/980,291 dated Mar. 24, 2021.
Notice of Allowance on U.S. Appl. No. 15/980,305 Dtd Jun. 27, 2019.
Notice of Allowance on U.S. Appl. No. 15/980,356 Dtd Sep. 24, 2019.
Notice of Preliminary Rejection for KR Appl. No. 10-2018-7017810 dated Nov. 12, 2018, with English translation (13 pages).
Notification of the First Office Action for CN201580009634.6 dated May 4, 2018, with English translation (15 pages).
Office Action for KR 10-2018-7016036 dated Nov. 12, 2018, with English translation (13 pages).
Office Action in JP 2018-116336 dated Sep. 21, 2018, with English translation (7 pages).
Office Action in JP 2018-525361 dated Sep. 21, 2018, with English translation (6 pages).
Office Action in JP2018-116336 dated Mar. 26, 2019 with English translation (8 pages).
Office Action in JP2018-525557 dated May 24, 2019, with English translation (14 pages).
Office Action issued in JP 2016-549225, dated Sep. 25, 2017, with English translation (9 pages).
Office Action received in JP 2018-133361 dated Dec. 10, 2018, with English translation (8 pages).
Office Action received in JP 2018-133362 dated Dec. 7, 2018, with English translation (6 pages).
Office Action received in JP 2018-525359 dated Dec. 10, 2018, no English translation available (4 pages ).
Second Office Action issued in CA2937948 dated Jun. 11, 2018 (4 pages).
Third Office Action in JP 2018-116336 dated Dec. 20, 2019, with English translation (9 pages).
Translation of Baranov et al., "The Opportunities of Electrochemical Air Regeneration Technology on the Base of Molten Carbonate Fuel Cells", Chemical Industry Today, 9, 3, 2016, 3-14 (Year: 2016).
US Notice of Allowance on U.S. Appl. No. 15/980,305 dated Feb. 14, 2019.
US Notice of Allowance on U.S. Appl. No. 16/091,001 Dtd Jan. 24, 2022.
US Office Action on U.S. Appl. No. 16/091,001 Dtd May 21, 2020.
Wang et al., "The intensification technologies to water electrolysis for hydrogen production—A review", Renewable and Sustainable Energy Reviews 29 (2014) 573-588.

* cited by examiner

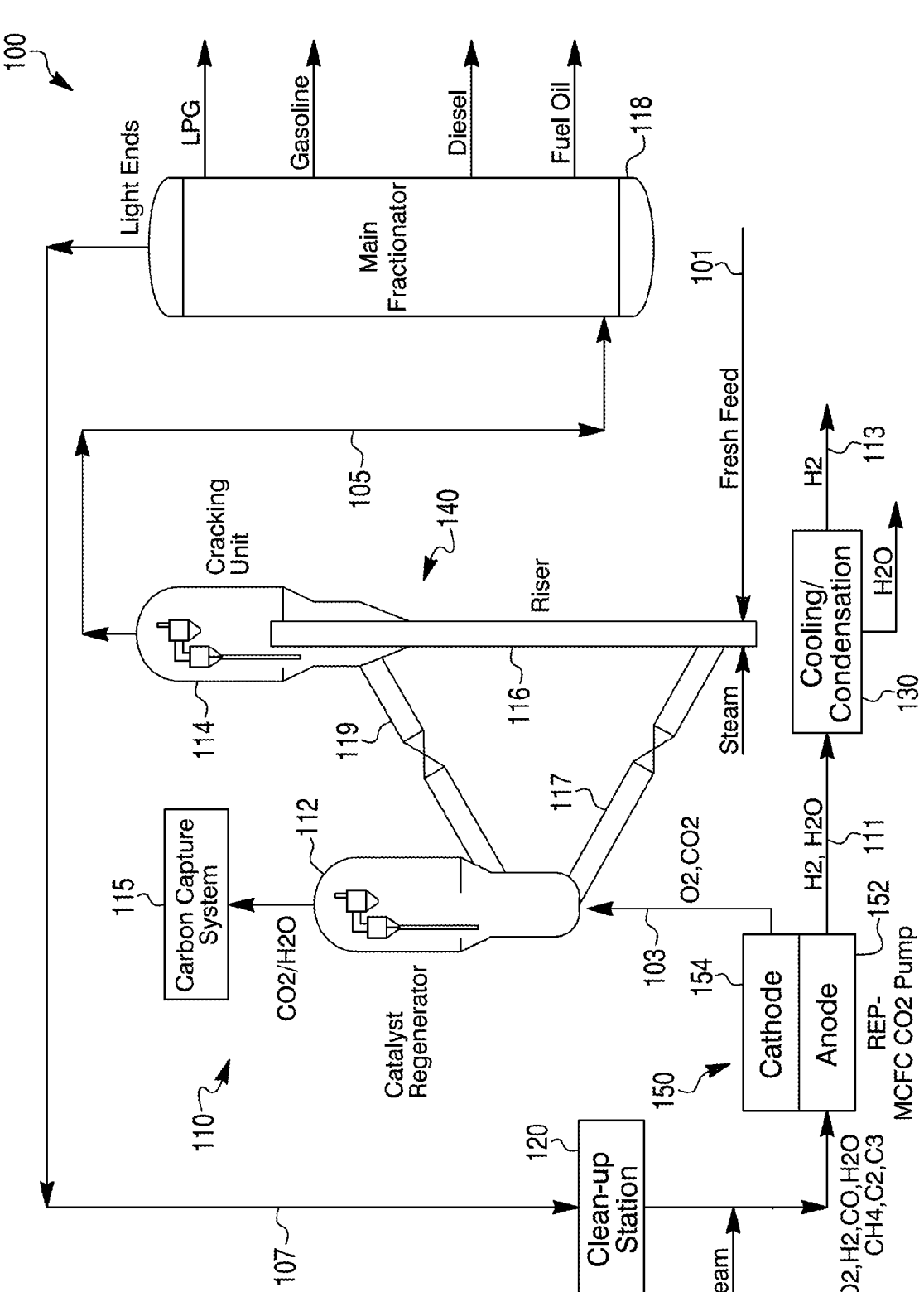

FLUIDIZED CATALYTIC CRACKING UNIT SYSTEM WITH INTEGRATED REFORMER-ELECTROLYZER-PURIFIER

CROSS REFERENCE TO RELATED APPLICATIONS

This application is a continuation of U.S. patent application Ser. No. 16/091,001, filed on Oct. 3, 2018, which is a U.S. National Phase application under 35 U.S.C. § 371 of International Application No. PCT/US2017/028321, filed on Apr. 19, 2017, which claims priority to U.S. Provisional Appl. No. 62/325,707, filed on Apr. 21, 2016, all of which are hereby incorporated by reference in their entireties.

BACKGROUND

The present disclosure relates to fluidized catalytic cracking units for the production of refined hydrocarbon products. In particular, the present disclosure relates to a fluidized catalytic cracking unit system having an integrated reformer-electrolyzer-purifier.

A fluidized catalytic cracking unit (FCCU) is a system used in petroleum refineries to convert hydrocarbon-based crude oil or a heavier fraction of crude oil into lighter, refined hydrocarbon products, such as gasoline, diesel, liquefied petroleum gas (LPG), or the like. A byproduct of this process is carbon dioxide contained in a flue gas of the FCCU, which is normally vented into the atmosphere for disposal. Carbon dioxide, however, is considered a harmful emission due to its effect on climate change. Thus, there has been a recent trend in reducing and/or eliminating the need to emit carbon dioxide into the atmosphere during the refinery process. As the FCCU may often be a significant contributor to the production of carbon dioxide in a refinery system, it is desirable to capture carbon dioxide that would otherwise be emitted to the air. The captured carbon dioxide may be used for other purposes, such as underground storage or oil production needs, or otherwise sequestered.

Problems can arise when removing carbon dioxide from an FCCU flue gas due to the low purity of carbon dioxide present in the flue gas stream. To effectively remove the carbon dioxide, a high rate of energy must be expended, making many current methods for carbon dioxide removal from the flue gas of the FCCU highly inefficient. This, in turn, reduces the production capabilities of the refinery as a whole. Thus, it would be advantageous to provide an efficient and cost-effective system that can effectively produce a highly-pure $CO_2$ flue gas from a FCCU.

SUMMARY

In one embodiment, a fluidized catalytic cracking unit system comprises a fluidized catalytic cracking unit assembly comprising a cracking unit; a reformer-electrolyzer-purifier assembly comprising a reformer-electrolyzer-purifier cell, the reformer-electrolyzer-purifier cell comprising an anode section and a cathode section; and a carbon capture assembly. The anode section of the reformer-electrolyzer-purifier assembly is configured to receive an input stream comprising hydrocarbon gases and water. The cathode section of the reformer-electrolyzer-purifier assembly is configured to produce a cathode exhaust stream comprising oxygen and carbon dioxide. The fluidized catalytic cracking unit assembly is configured to receive the cathode exhaust stream and to produce a flue gas comprising carbon dioxide, water, and less than 5 mole % oxygen. The carbon capture assembly is configured to receive the flue gas from the fluidized catalytic cracking unit assembly, to separate the carbon dioxide contained in the flue gas, and to produce a gas stream that comprises at least 90 mole % carbon dioxide.

In one aspect of this embodiment, the carbon capture assembly is configured to condense and cool the flue gas and to remove the carbon dioxide contained in the flue gas.

In one aspect of this embodiment, the fluidized catalytic cracking unit assembly comprises a first catalyst regenerator unit that is configured to receive the cathode exhaust stream.

In one aspect of this embodiment, the cracking unit of the fluidized catalytic cracking unit assembly comprises a riser and a catalyst separation unit; the riser is configured to receive catalyst from the first catalyst regenerator unit, to receive steam and hydrocarbon feedstock, to crack the hydrocarbon feedstock into smaller molecules using the catalyst, and to provide cracked hydrocarbons and spent catalyst to the catalyst separation unit; and the catalyst separation unit is configured to separate the cracked hydrocarbons from spent catalyst, to output a cracked hydrocarbon stream, and to output the spent catalyst to the first catalyst regenerator unit.

In one aspect of this embodiment, the system further comprises a fractionation assembly that is configured to receive the cracked hydrocarbon stream from the catalyst separation unit.

In one aspect of this embodiment, the anode input stream comprises a mixture of a light end stream produced by the fractionation assembly and steam.

In one aspect of this embodiment, the catalyst separation unit is configured to output an amount of the spent catalyst to the first catalyst regenerator unit such that, when the oxygen and carbon dioxide from the reformer-electrolyzer-purifier assembly is used to regenerate the spent catalyst in the first catalyst regenerator unit, an amount of carbon on the spent catalyst is correlated to an amount of oxygen and carbon dioxide received from the reformer-electrolyzer-purifier assembly so as to minimize an amount of excess oxygen output by the first catalyst regenerator unit.

In one aspect of this embodiment, the fluidized catalytic cracking unit assembly further comprises a second catalyst regenerator unit; and the second catalyst regenerator unit is configured to receive any excess catalyst from the first catalyst separation unit that is not needed to minimize the excess oxygen output by the first catalyst regenerator, and to regenerate the excess catalyst using air.

In one aspect of this embodiment, the fluidized catalytic cracking unit assembly further comprises a second catalyst regenerator unit; the cathode section of the reformer-electrolyzer-purifier assembly is configured to produce a cathode exhaust stream comprising oxygen and carbon dioxide; the catalyst separation unit is configured to output an amount of spent catalyst to the first catalyst regenerator unit such that substantially all oxygen from the reformer electrolyzer purifier assembly is consumed to partially regenerate the spent catalyst; and the second catalyst regenerator unit is configured to receive an input stream that includes the partially regenerated spent catalyst from the first catalyst regenerator unit and the cathode exhaust stream from the cathode section of the reformer-electrolyzer-purifier assembly, and to complete regeneration of the partially regenerated spent catalyst by reacting the partially regenerated spent catalyst with air.

In one aspect of this embodiment, the system further comprises a fractionation assembly, wherein the anode input stream comprises a mixture of a light end stream produced by the fractionation assembly and steam.

In one aspect of this embodiment, the fractionation assembly is configured to receive a cracked hydrocarbon stream from the cracking unit of the fluidized catalytic cracking unit assembly.

In one aspect of this embodiment, the cathode exhaust stream from the reformer-electrolyzer-purifier assembly comprises oxygen in a range of 25 to 40 mole % and carbon dioxide in a range of 60 to 75 mole %.

In one aspect of this embodiment, the anode section is configured to produce an anode exhaust stream comprising primarily water and hydrogen.

In one aspect of this embodiment, the system further comprises a cooling and condensation system configured to cool and condense the anode exhaust stream, to remove the water contained in the anode exhaust stream, and to produce a hydrogen stream.

In one aspect of this embodiment, the hydrogen stream comprises at least 95 mole % hydrogen.

In one aspect of this embodiment, the reformer-electrolyzer-purifier cell is a molten carbonate electrolysis cell.

In another embodiment, a method for removing carbon dioxide from a fluidized catalytic cracking unit assembly comprises providing a fluidized catalytic cracking unit assembly comprising a cracking unit; providing a reformer-electrolyzer-purifier assembly comprising a reformer-electrolyzer-purifier cell, the reformer-electrolyzer-purifier cell comprising an anode section and a cathode section; providing a carbon capture assembly; at the anode section, receiving an input stream comprising hydrocarbon gases and water; at the cathode section, producing a cathode exhaust stream comprising oxygen and carbon dioxide; at the fluidized catalytic cracking unit assembly, receiving the cathode exhaust stream and producing a flue gas comprising carbon dioxide, water, and less than 5 mole % oxygen; and at the carbon capture assembly receiving the flue gas from the fluidized catalytic cracking unit assembly, separating the carbon dioxide contained in the flue gas, and producing a gas stream that comprises at least 90 mole % carbon dioxide.

In another embodiment, a fluidized catalytic cracking unit system comprises a fluidized catalytic cracking unit assembly comprising a cracking unit and a first catalyst regenerator unit, the fluidized catalytic cracking unit assembly being configured to output a cracked hydrocarbon stream; a fractionation assembly configured to receive the cracked hydrocarbon stream from the fluidized catalytic cracking unit assembly, to separate the cracked hydrocarbon stream into hydrocarbon products, and to output a light end stream; and a reformer-electrolyzer-purifier assembly comprising a reformer-electrolyzer-purifier cell, the reformer-electrolyzer-purifier cell comprising an anode section and a cathode section. The anode section of the reformer-electrolyzer-purifier assembly is configured to receive an anode input stream that includes the light end stream output by the fractionation assembly.

In one aspect of this embodiment, the system further includes a carbon capture assembly. The cathode section of the reformer-electrolyzer-purifier assembly is configured to produce a cathode exhaust stream comprising oxygen and carbon dioxide. The fluidized catalytic cracking unit assembly is configured to receive the cathode exhaust stream and to produce a flue gas comprising carbon dioxide, water, and less than 5 mole % oxygen. The carbon capture assembly is configured to receive the flue gas from the fluidized catalytic cracking unit assembly, to separate the carbon dioxide contained in the flue gas, and to produce a gas stream that comprises at least 90 mole % carbon dioxide.

In one aspect of this embodiment, the carbon capture assembly is configured to condense and cool the flue gas and to remove the carbon dioxide contained in the flue gas.

In one aspect of this embodiment, the cathode section of the reformer-electrolyzer-purifier assembly is configured to produce a cathode exhaust stream comprising oxygen and carbon dioxide. The first catalyst regenerator unit is configured to receive the cathode exhaust stream output from the cathode section of the reformer-electrolyzer-purifier assembly.

In one aspect of this embodiment, the cracking unit of the fluidized catalytic cracking unit assembly comprises a riser and a catalyst separation unit. The riser is configured to receive catalyst from the first catalyst regenerator unit, to receive steam and hydrocarbon feedstock, to crack the hydrocarbon feedstock into smaller molecules using the catalyst, and to provide cracked hydrocarbons and spent catalyst to the catalyst separation unit. The catalyst separation unit is configured to separate the cracked hydrocarbons from spent catalyst, to output the cracked hydrocarbon stream, and to output the spent catalyst to the first catalyst regenerator unit.

In one aspect of this embodiment, the fractionation assembly is configured to receive the cracked hydrocarbon stream from the catalyst separation unit.

In one aspect of this embodiment, the anode input stream comprises a mixture of the light end stream produced by the fractionation assembly and steam.

In one aspect of this embodiment, the catalyst separation unit is configured to output an amount of the spent catalyst to the first catalyst regenerator unit such that, when the oxygen and carbon dioxide from the reformer-electrolyzer-purifier assembly is used to regenerate the spent catalyst in the first catalyst regenerator unit, an amount of carbon on the spent catalyst is correlated to an amount of oxygen and carbon dioxide received from the reformer-electrolyzer-purifier assembly so as to minimize excess oxygen output by the first catalyst regenerator unit.

In one aspect of this embodiment, the fluidized catalytic cracking unit assembly further comprises a second catalyst regenerator unit; and the second catalyst regenerator unit is configured to receive any excess catalyst from the first catalyst separation unit that is not needed to minimize the excess oxygen output by the first catalyst regenerator, and to regenerate the excess catalyst using air.

In one aspect of this embodiment, the fluidized catalytic cracking unit assembly further comprises a second catalyst regenerator unit; the cathode section of the reformer-electrolyzer-purifier assembly is configured to produce a cathode exhaust stream comprising oxygen and carbon dioxide; the catalyst separation unit is configured to output an amount of spent catalyst to the first catalyst regenerator unit such that substantially all oxygen from the reformer electrolyzer purifier assembly is consumed to partially regenerate the spent catalyst; and the second catalyst regenerator unit is configured to receive an input stream that includes the partially regenerated spent catalyst from the first catalyst regenerator unit and the cathode exhaust stream from the cathode section of the reformer-electrolyzer-purifier assembly, and to complete regeneration of the partially regenerated spent catalyst by reacting the partially regenerated spent catalyst with air.

In one aspect of this embodiment, the cathode exhaust stream comprises oxygen in a range of 25 to 40 mole % and carbon dioxide in a range of 60 to 75 mole %.

In one aspect of this embodiment, the anode section is configured to produce an anode exhaust stream comprising primarily water and hydrogen.

In one aspect of this embodiment, the system further comprises a cooling and condensation system configured to cool and condense the anode exhaust stream, to remove the water contained in the anode exhaust stream, and to produce a hydrogen stream.

In one aspect of this embodiment, the hydrogen stream comprises at least 95 mole % hydrogen.

In one aspect of this embodiment, the reformer-electrolyzer-purifier cell is a molten carbonate electrolysis cell.

In another embodiment, a method of using a fluidized catalytic cracking unit system comprises providing a fluidized catalytic cracking unit assembly comprising a cracking unit and a first catalyst regenerator unit; providing a fractionation assembly; providing a reformer-electrolyzer-purifier assembly comprising a reformer-electrolyzer-purifier cell, the reformer-electrolyzer-purifier cell comprising an anode section and a cathode section; at the fluidized catalytic cracking unit assembly, outputting a cracked hydrocarbon stream; at the fractionation assembly, receiving the cracked hydrocarbon stream from the fluidized catalytic cracking unit assembly, separating the cracked hydrocarbon stream into hydrocarbon products, and outputting a light end stream; at the anode section of the reformer-electrolyzer-purifier assembly, receiving an anode input stream that includes the light end stream output by the fractionation assembly.

These and other advantageous features will become apparent to those reviewing the disclosure and drawings.

BRIEF DESCRIPTION OF THE DRAWINGS

FIG. 1 shows a schematic view of a fluidized catalytic cracking unit system having an integrated reformer-electrolyzer-purifier assembly, according to an embodiment of the present invention.

DETAILED DESCRIPTION

Referring generally to the FIGURES, disclosed herein is an FCCU system capable of producing a highly purified $CO_2$ flue gas while co-producing a highly pure hydrogen stream for use in the refinery that is both less costly and highly efficient in terms of energy production.

FIG. 1 shows a $CO_2$ capture system 100 for capturing carbon dioxide from an exhaust stream produced by a FCCU. As shown in FIG. 1, the system 100 generally includes a FCCU assembly 110, a reformer-electrolyzer-purifier (REP) assembly 150, and a fractionation assembly 118. REP assemblies are described, for example, in PCT Publication No. WO2015116964, which is hereby incorporated by reference for all its teachings related to REP assemblies. The FCCU assembly 110 includes a catalyst regenerator unit 112, and a cracking unit 140 that includes a catalyst separation unit 114 and a riser 116. In the embodiment shown in FIG. 1, the FCCU assembly 110 is shown as a side-by-side type FCCU. However, the FCCU assembly 110 is not limited to such a configuration and may instead include other FCCU configuration types, such as a stacked type FCCU.

During operation of the FCCU assembly 110, hydrocarbon feedstock, in the form of, for example, crude oil or a heavy fraction of the crude oil, is supplied through a feed line 101 to the riser 116 where it is mixed with and dispersed by steam. At the same time, catalyst from the catalyst regenerator unit 112 enters the riser 116 through a catalyst return line 117. In the riser 116, the feed and steam mixture is vaporized and cracked down into smaller molecules as the mixture is heated by and reacts on the catalyst entering through the catalyst return line 117, resulting in smaller-chain, lighter hydrocarbons. The resulting feed and steam mixture, along with the catalyst, flows upward and is cracked into smaller hydrocarbons in the reactor/riser. The gases then enter the catalyst separation unit 114 of the cracking unit 140.

In the catalyst separation unit 114 of the cracking unit 140, the cracked hydrocarbons from the feed and steam mixtures are separated from the spent catalyst and removed from the cracking unit 140 via a cracked product flow line 105. The cracked hydrocarbons flow through the cracked flow line 105 to the main fractionation assembly 118, where the stream is further processed into various refined forms of hydrocarbons, such as LPG, gasoline, diesel, and fuel oil. These products are removed from the main fractionation assembly 118 and exported as products for energy uses. The light ends stream, comprising mainly of hydrogen and light hydrocarbons, exits the fractionation assembly 118 through a light ends line 107 where the light ends stream is cleaned up to remove impurities (e.g., sulfur) at a clean-up station 120 before being reintroduced into the system at the REP assembly 150. The spent catalyst, on the other hand, is removed from the cracking unit 140 through a catalyst regenerating line 119 to enter the catalyst regenerator unit 112. To regenerate the spent catalyst, material deposited on the catalyst during the reactions (e.g., carbon) is burned off. In conventional FCCU assemblies, air is introduced into the regenerator to facilitate the burning of the deposited material from the catalyst. However, in the system 100 shown in FIG. 1, a carbon dioxide and oxygen stream, in the form of a cathode exhaust stream from the REP assembly 150, is introduced to the catalyst regenerator unit 112 through a cathode exhaust stream line 103 in place of air. As will be described in more detail below, compared to air, the cathode exhaust stream contains a higher concentration of oxygen, which helps in the combustion of the deposited material on the catalyst.

The oxygen and carbon dioxide from the reformer-electrolyzer-purifier assembly is used to regenerate the spent catalyst in the catalyst regenerator unit. In one embodiment, the amount of carbon on the spent catalyst is correlated to the amount of oxygen and carbon dioxide so as to minimize an amount of excess oxygen output by the catalyst regenerator unit. As a result, the resulting flue gas, comprising mostly of carbon dioxide and water with little to no nitrogen and minimal oxygen (e.g., less than 5 mole % reacted oxygen), contains a more concentrated form of $CO_2$. For example, in some embodiments, after the water in flue gas is condensed and removed, the carbon dioxide content may be greater than 90 mole %.

In another embodiment, the FCCU assembly 110 further comprises a second catalyst regenerator unit (not shown); and the second catalyst regenerator unit is configured to receive any excess catalyst from the first catalyst separation unit that is not needed to minimize the excess oxygen output by the first catalyst regenerator, and to regenerate the excess catalyst using air.

In another embodiment, the FCCU assembly 110 further comprises a second catalyst regenerator unit (not shown); the cathode section of the reformer-electrolyzer-purifier assembly is configured to produce a cathode exhaust stream comprising oxygen and carbon dioxide; the catalyst separation unit is configured to output an amount of spent catalyst to the first catalyst regenerator unit such that substantially all oxygen from the reformer electrolyzer purifier assembly is consumed to partially regenerate the spent catalyst; and the second catalyst regenerator unit is config-ured to receive an input stream that includes the partially regenerated spent catalyst from the first catalyst regenerator unit and the cathode exhaust stream from the cathode section of the reformer-electrolyzer-purifier assembly, and to com-plete regeneration of the partially regenerated spent catalyst by reacting the partially regenerated spent catalyst with air.

The flue gas from the FCCU assembly 110 may be directed to a carbon capture assembly 115, where the carbon dioxide contained in the flue gas may be extracted. For example, the carbon capture assembly 115 may be in the form of a compression/condensation/refrigeration system. In the compression/condensation/refrigeration system, the combustion flue gas is cooled and condensed to separate out a liquid, highly pure $CO_2$ stream. Alternately, in other embodiments, the $CO_2$ may be captured without further purification. In other embodiments, hydrogen or other hydrocarbons may be reacted over catalyst with the residual oxygen in the flue gas to minimize the $O_2$ remaining in the flue gas to produce a $CO_2$ stream over 95% pure. In some embodiments, the resulting stream from the carbon capture assembly 115, after water removal, may include pure $CO_2$. This $CO_2$ stream may then be used for other purposes, such as underground storage or oil production needs. Off-gases from the various refinery processes may be added to the feed to the anode section of the reformer-electrolyzer-purifier assembly in addition to or in place of the light ends 107.

The REP assembly 150 comprises REP cells, which are capable of internally reforming and purifying hydrogen from fuel, which can later be used for the production of electricity in a fuel cell or used in other refining processes. The REP cell is preferably a molten carbonate electrolysis cell (MCEC). An example of an REP cell is described in greater detail in International Patent Application No. PCT/US2015/013837, which is incorporated by reference herein in its entirety.

As shown in FIG. 1, an REP cell of the REP assembly 150 generally includes an anode section 152 having a catalyst layer, a cathode section 154 having a catalyst layer, and an electrolyte layer (not shown) for the transfer of ions between the anode section 152 and the cathode section 154. In addition, the REP assembly 150 comprises a power supply (not shown), which is configured to apply a voltage to the REP cell in order to drive the internal electrochemical reactions. During operation of the REP cell as an MCEC unit, after exiting the clean-up station 120, steam is added to the cleaned exhaust stream to form an input stream that is introduced to the anode section 152 through an input line 152. At this point, the input stream comprises hydrogen gas, water, and various light hydrocarbon gases (e.g., carbon dioxide, methane, carbon monoxide, ethane, and propane).

After the input stream is introduced into the anode section 152, a reforming reaction takes place within the REP cell to convert the hydrocarbon gases to carbon dioxide and hydro-gen. An electrolysis/$CO_2$ pump reaction removes the $CO_2$ from the system driving the reforming reaction to comple-tion. The overall reforming reaction may be generally expressed as $C_mH_n+2mH_2O \rightarrow (n/2+m)H_2+mCO_2$, where the resulting carbon dioxide is removed from the input stream by the electrolysis/$CO_2$ pump reaction. The overall elec-trolysis/$CO_2$ pump reaction may be generally expressed as $CO_2+H_2O \rightarrow H_2+CO_3^=$, where the resulting $CO_3^=$ ions are removed by the electrolysis pump action and sent to the REP cathode section. In particular, at the anode section 152, reactions take place between the hydrocarbon gases, water, and electrons flowing to the anode section 152 due to the voltage applied by the power supply, resulting in the production of hydrogen and carbonate ions. Hydrogen gas and residual water exit the anode section 152 as an anode exhaust stream through an anode exhaust line 111. The hydrogen gas contained in the anode exhaust stream is contained in a highly pure form (e.g., about 70 mole % or greater including water). The anode exhaust stream may then be introduced to a compression/condensation/refrigera-tion unit 130. At the compression/condensation/refrigeration unit 130, the anode exhaust stream is cooled and condensed to remove the water from the stream and produce a highly purified (e.g., about 95% or greater) hydrogen gas stream, which is removed via a hydrogen line 113. The hydrogen gas stream may thereafter be exported for other purposes, such as to offset the energy needs of the system 100 or to one or more external fuel cells. Meanwhile, the carbonate ions are transferred across the electrolyte layer to the cathode section 154, where the ions convert to oxygen, carbon dioxide, and electrons. The electrons flow from the cathode section 154 to the power supply completing the electrical circuit in the REP cell. Thus, the transfer of the carbonate ions together with the subsequent dissociation reaction to $CO_2$ and $O_2$ at the cathode section 154 has the effect of pumping carbon dioxide and oxygen out of the input stream, while co-producing hydrogen gas.

The carbon dioxide and oxygen pumped out by the electrolysis reaction exits the cathode section 154 as the cathode exhaust stream, where it is introduced into the catalyst regenerator unit 112 via the cathode exhaust stream line 103 to facilitate the combustion process in the catalyst regenerator unit 112, as described above. In some embodi-ments, the cathode exhaust stream may contain 25-40 mole % of oxygen (e.g., about 33 mole % of oxygen) and 60-75 mole % of carbon dioxide (e.g., about 67 mole % of carbon dioxide). As a result of the regenerator 112 being supplied with a highly pure oxygen and carbon dioxide stream instead of air, the generated flue gas contains a high concentration of carbon dioxide. This high-purity $CO_2$ flue gas allows for a more efficient carbon dioxide capture system during the subsequent carbon dioxide removal process. Moreover, even if a carbon dioxide capture system 115 is not employed, $NO_x$ emissions may be reduced or eliminated by the system 100 since no $N_2$ is fed to the regenerator 112.

In addition, the system 100 allows for the conversion of the light ends stream from the main fractionation assembly 118 through the use of the REP assembly 150 by $CO_2$ removal and reforming to high value hydrogen. As a result, nearly 100% of the carbon in the hydrocarbon REP feed-stock may be captured as $CO_2$ in the flue gas, with a small portion (e.g., about 2%) of the carbon exiting as a methane impurity in hydrogen gas. The production of a highly pure hydrogen gas may then be realized by adding to the hydro-gen contained in the purified, reformed light ends stream with additional hydrogen due to the electrolysis/pump reac-tion. Thus, power consumed by the driving of the electroly-sis/pump reaction may be offset due to the value of the value of the additional hydrogen co-produced from water in the electrolysis/pump reaction.

The system 100 may be sized for a given location. For example, a plurality of REP assemblies 150 may be incor-porated into the system 100 depending on need. Also, the spent catalyst 119 may be sent to parallel regenerators, one regenerator using air to generate the catalyst and the other regenerator using the CO2 oxygen from the REP. Since the amount of CO2 and oxygen generated by the REP is a function of the carbon fed to the REP, this allows the system to operate with only the light ends from the FCCU fed to the REP and still have enough oxygen to regenerate all of the spent catalyst. When a renewable feedstock is part or all of fresh feed 101, the system 100 may be capable of producing a highly pure hydrogen gas output without any net $CO_2$ emissions, even without a carbon capture assembly 115. Some gasification units for biomass gasification are configured in a manner similar to an FCCU. The FCCU system may realize a lower operating and capital cost, while producing a highly pure flue gas and hydrogen syngas for increased value.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A fluidized catalytic cracking unit system comprising:
a fluidized catalytic cracking unit assembly comprising a first catalyst regenerator and a cracking unit, the cracking unit configured to output spent catalyst to the first catalyst regenerator; and
a reformer-electrolyzer-purifier assembly comprising a reformer-electrolyzer-purifier cell, the reformer-electrolyzer-purifier cell comprising an anode section and a cathode section;
wherein the anode section of the reformer-electrolyzer-purifier assembly is configured to receive an anode input stream comprising hydrocarbon gases and water;
wherein the cathode section of the reformer-electrolyzer-purifier assembly is configured to produce a cathode exhaust stream comprising oxygen and carbon dioxide;
wherein the first catalyst regenerator is configured to:
receive the cathode exhaust stream;
regenerate the spent catalyst and form carbon dioxide by burning carbon on the spent catalyst using the oxygen in the cathode exhaust stream; and
generate a flue gas comprising the carbon dioxide from the cathode exhaust stream, carbon dioxide formed from regenerating the spent catalyst, and residual oxygen from the cathode exhaust stream; and
wherein the fluidized catalytic cracking unit system further comprises a carbon capture assembly configured to cool the flue gas to condense carbon dioxide in the flue gas.

2. The system of claim 1, further comprising a condenser configured to remove water from the flue gas and output a dried flue gas stream that comprises at least 90 mole % carbon dioxide.

3. The system of claim 1, wherein the carbon capture assembly is configured to produce a stream that comprises at least 90 mole % carbon dioxide.

4. The system of claim 1, wherein:
the cracking unit of the fluidized catalytic cracking unit assembly comprises a riser and a catalyst separation unit;
the riser is configured to receive catalyst from the first catalyst regenerator, to receive steam and hydrocarbon feedstock, to crack the hydrocarbon feedstock into smaller molecules using the catalyst, and to provide cracked hydrocarbons and spent catalyst to the catalyst separation unit; and
the catalyst separation unit is configured to separate the cracked hydrocarbons from spent catalyst, to output a cracked hydrocarbon stream, and to output the spent catalyst to the first catalyst regenerator.

5. The system of claim 4, further comprising a fractionation assembly that is configured to receive the cracked hydrocarbon stream from the catalyst separation unit and output a light ends stream.

6. The system of claim 5, wherein the anode section of the reformer-electrolyzer-purifier assembly is configured to receive the light ends stream produced by the fractionation assembly as the anode input stream.

7. The system of claim 1, wherein:
the fluidized catalytic cracking unit assembly further comprises a second catalyst regenerator unit; and
the second catalyst regenerator unit is configured to receive any excess catalyst from the cracking unit that is not needed to minimize excess oxygen output by the first catalyst regenerator, and to regenerate the excess catalyst using air.

8. The system of claim 1, wherein the cathode section of the reformer-electrolyzer-purifier assembly is configured to produce a stream that comprises oxygen in a range of 25 to 40 mole % and carbon dioxide in a range of 60 to 75 mole % as the cathode exhaust stream.

9. The system of claim 1, wherein the anode section is configured to produce an anode exhaust stream comprising primarily water and hydrogen.

10. The system of claim 9, further comprising a cooling and condensation system configured to cool and condense the anode exhaust stream, to remove the water contained in the anode exhaust stream, and to produce a hydrogen stream.

11. The system of claim 10, wherein the hydrogen stream comprises at least 95 mole % hydrogen.

12. The system of claim 1, wherein the reformer-electrolyzer-purifier cell is a molten carbonate electrolysis cell.

13. The system of claim 1, wherein the cathode exhaust stream is the only source of oxygen to the first catalyst regenerator.

14. A fluidized catalytic cracking unit system comprising:

a fluidized catalytic cracking unit assembly comprising a first catalyst regenerator, a second catalyst regenerator, and a cracking unit, the cracking unit configured to output spent catalyst to the first catalyst regenerator; and a reformer-electrolyzer-purifier assembly comprising a reformer-electrolyzer-purifier cell, the reformer-electrolyzer-purifier cell comprising an anode section and a cathode section;

wherein the anode section of the reformer-electrolyzer-purifier assembly is configured to receive an anode input stream comprising hydrocarbon gases and water;

wherein the cathode section of the reformer-electrolyzer-purifier assembly is configured to produce a cathode exhaust stream comprising oxygen and carbon dioxide;

wherein the first catalyst regenerator is configured to:

receive the cathode exhaust stream;

partially regenerate the spent catalyst and form carbon dioxide by burning carbon on the spent catalyst using the oxygen in the cathode exhaust stream;

generate a flue gas comprising the carbon dioxide from the cathode exhaust stream, carbon dioxide formed from regenerating the spent catalyst, and residual oxygen from the cathode exhaust stream;

wherein the second catalyst regenerator is configured to receive the partially regenerated spent catalyst from the first catalyst regenerator and finish regenerating the partially regenerated spent catalyst by reacting the partially regenerated spent catalyst with air; and wherein the fluidized catalytic cracking unit system further comprises a carbon capture assembly configured to cool the flue gas to condense carbon dioxide in the flue gas.

15. The system of claim 1, wherein the first catalyst regenerator is configured to receive an entirety of the cathode exhaust stream.

* * * * *